United States Patent [19]

Zhang

[11] Patent Number: 5,610,657
[45] Date of Patent: Mar. 11, 1997

[54] VIDEO COMPRESSION USING AN ITERATIVE ERROR DATA CODING METHOD

[75] Inventor: Tai Y. Zhang, Berkeley, Calif.

[73] Assignee: Envistech Inc., Bayside, N.Y.

[21] Appl. No.: 121,828

[22] Filed: Sep. 14, 1993

[51] Int. Cl.[6] .................................................. H04N 7/36
[52] U.S. Cl. ............................................................ 348/415
[58] Field of Search ................................. 348/402, 401, 348/400, 416, 415, 409, 420, 390, 384

[56] References Cited

U.S. PATENT DOCUMENTS

| | | | |
|---|---|---|---|
| 5,046,071 | 9/1991 | Tanoi | 348/415 |
| 5,046,122 | 9/1991 | Nakaya et al. | 382/56 |
| 5,051,840 | 9/1991 | Watanabe et al. | 358/433 |
| 5,058,186 | 10/1991 | Miyaoka et al. | 382/56 |
| 5,065,447 | 11/1991 | Barnsley et al. | 382/56 |
| 5,086,487 | 2/1992 | Katayama et al. | 382/56 |
| 5,086,488 | 2/1992 | Kato et al. | 382/56 |
| 5,086,489 | 2/1992 | Shimura | 382/56 |
| 5,091,782 | 2/1992 | Krause et al. | 358/135 |
| 5,091,976 | 2/1992 | Murayama | 382/56 |
| 5,095,374 | 3/1992 | Klein et al. | 358/430 |
| 5,101,446 | 3/1992 | Resnikoff et al. | 382/56 |
| 5,109,438 | 4/1992 | Alves et al. | 382/56 |
| 5,109,451 | 4/1992 | Aono et al. | 382/56 |
| 5,113,255 | 5/1992 | Nagata et al. | 348/416 |
| 5,113,457 | 5/1992 | Enomoto et al. | 382/56 |
| 5,115,479 | 5/1992 | Murayama | 382/56 |
| 5,117,287 | 5/1992 | Koike et al. | 358/133 |
| 5,121,216 | 6/1992 | Chen et al. | 358/261.3 |
| 5,126,962 | 6/1992 | Chiang | 364/725 |
| 5,127,064 | 6/1992 | Flinois et al. | 382/56 |
| 5,177,608 | 1/1993 | Ohki et al. | 348/416 |
| 5,258,836 | 11/1993 | Murata | 348/416 |

FOREIGN PATENT DOCUMENTS 2855395  7/1979  Germany ........................ H04N 7/14

Primary Examiner—Howard W. Britton
Assistant Examiner—Bryan S. Tung
Attorney, Agent, or Firm—Pennie & Edmonds

[57] ABSTRACT

An adaptive system and method for data storage and communication which is primarily used for the storage and transmission of large volumes of data, especially video data, over band-limited communication channels. The video coder of the system uses a prediction video signal which is subtracted from the input image to define a processing region in which image blocks of predetermined dimensions have large prediction error. The prediction image is successively improved by iteratively processing large error image blocks until the error is reduced below a predetermined threshold. At different processing iterations and image blocks, different compression techniques can be used to improve the overall system efficiency.

22 Claims, 4 Drawing Sheets

VIDEO COMPRESSION USING AN ITERATIVE ERROR DATA CODING METHOD

FIELD OF THE INVENTION

The present invention relates to a system and method for data communication and storage. More specifically, the present invention relates to an adaptive system and method for compression of two-dimensional digital images, time sequences of such images, and the transmission and storage of such data over band-limited channels.

BACKGROUND OF THE INVENTION

Systems for digital transmission and storage of television, still image and other video signals have been shown to perform significantly better than corresponding analog systems. The inherent advantages of the digital communication and storage techniques are primarily due to the fact that information is transmitted and stored in a binary form which is much less susceptible to noise, electronic component distortions and other distortions in conventional analog systems. In addition, the representation of the video signals in a digital form enables the use of noise reduction techniques and advanced signal processing algorithms which may be difficult or impossible to implement when operating on conventional analog signals. Digital signal representation and processing can also ensure exact repeatability of the system output signals, regardless of the electronic circuitry or transmission media. It is therefore expected that digital video systems will soon replace existing analog systems just as digital compact discs have largely replaced analog records in the audio industry.

The advantages of digital transmission techniques come, however, at the expense of a much wider required frequency bandwidth. This is particularly true in the case of high definition television ("HDTV") and modern multimedia systems where huge volumes of data have to be processed and stored, often in real time. It appears that in the future the demand for information storage and exchange will grow at an even faster pace. This demand, due to the physical limitations of the available communication channels and the electronic circuitry, presents serious technical problems such as the acquisition, processing and storage of large volumes of data in real time.

Another important problem is that of transmission of video signals over the available communications channels and the prevention of interference from adjacent in frequency sources. The presently most popular and inexpensive means for the transmission of digital data is through the public telephone network. This network was, however, designed to receive, reroute and transmit analog signals in the voice frequency range which is significantly lower than the required one for video communication. The physical limitations of the available network impose severe restrictions on the achievable signal transmission rates, which in turn make the telephone network at present not suitable for general purpose handling of digital, and specifically motion video signals.

To illustrate the complexity of the problems, consider a modern video communication and storage system, such as those used in video-conferencing, cable TV, and CD-ROM. The standard Common Interface Format (CIF) resolution standard for such systems requires a luminance channel with 352 pixels/line×288 pixels/frame and 8 bits/pixel, and two chrominance channels for blue (Cb) and red (Cr) with half resolution of 176 pixels/line×144 pixels/frame and 8 bits/pixel. Full-motion video imaging further uses a 30 frames/s picture transmission rate. This corresponds to a raw video data rate of about 36.5 Mbits/s. By means of an example, using a good quality 28,800 bit/s modem, it would take 21 minutes to transmit one second of raw video data over a telephone line. In a separate example, a CD-ROM with a capacity of 650 Mbytes and a data transfer rate of 150 kbytes/s, can only store about 2 min and 20 seconds of uncompressed video data. In addition, it takes one second to display just a single video frame, which is obviously far too slow for motion video image processing.

For practical digital video communication and storage purposes it is thus necessary to reduce the amounts of data to be transmitted and stored by eliminating redundant information. It is further desirable to design systems which maximize the amount of data processed per unit time. One of the most promising approaches in this respect is the signal compression of digitized data which can drastically reduce the information volume to be processed, without causing a noticeable degradation of the output signal quality.

Generally, any signal compression is based on the presence of superfluous information in the original signal that can be removed to reduce the amount of data to be stored or transmitted. There are two main classes of information superfluous with respect to the intended receiver. The first one is known as statistical redundancy, which is primarily associated with similarities, correlation and predictability of data. Such statistical redundancy can theoretically be removed from the data without any information being lost.

The second class of superfluous information is known as subjective redundancy, which primarily has to do with data characteristics that can be removed without a human observer noticing degradation. A typical example would be the removal of temporal details in a motion video which occur too fast to be perceived by the human eye. Unlike statistical redundancy, the removal of subjective redundancy is typically irreversible, so that the original data cannot be fully recovered.

There are well known prior art compression and coding techniques to exploit both signal redundancies. Generally, they may be classified as predictive coding, transform coding and interpolative coding. Numerous techniques may not fall into those classes, since they combine features of one technique or another. Special techniques have been developed to exploit the temporal signal redundancy in applications involving the transmission and storage of sequences of video images.

In view of the diversity of available methods, and in order to unify the research and commercial effort in this direction, various signal compression standards have been proposed in the past. There are currently three major international standards for image compression: the JPEG standard; the Px64; and MPEG standards. These three standards address different aspects of image compression.

The JPEG standard is primarily directed toward compression of still images, but has also been employed for full-motion images. The JPEG standard recommends a combination of discrete cosine transform (DCT) and Huffman-type bit compression techniques. JPEG techniques typically yield a compression ratio of about 10:1 for monochrome images and 20:1 for color images at an acceptable quality.

Px64 is the common name for a series of standards for two-way transmission of video denoted H.261 and audio denoted G.711 and G.728. The H.261 standard mandates the use of very high data compression ratios of up to 200:1. The Px64 standard is intended for videophone and video conferencing applications. Such systems are capable of very high compression ratios, but generally exhibit limited spacial resolution (about 100×100 pixels per frame for a videophone) and poor motion rendition (about 3–10 frames per second for a videophone). As a result, such images show very little details. In addition, as implied by the name, the Px64 standard only works with multiples of 64 kbit/s data transmission rates in high speed telephone lines, such as a switched Integrated Services Digital Network (ISDN). It is not suitable and does not perform well in a bandlimited transmission medium such as standard analog telephone lines.

The MPEG standard, which is in many ways similar to the H.261 standard, is aimed at distributing full-motion images through such media as CD-ROMs or cable TV. Typically, the compression rate of MPEG is lower than that of H.261.

Other compression schemes, such as Intel's Real Time Video (RTV) version of Digital Video Interactive (DVI) compression, only result in compression rates of about 150:1.

In contrast, turning back to the full motion video example above, one can see that transmission over a telephone line using the same high speed modem would require a data compression ratio of about 1270:1. Those skilled in the art would appreciate that it is extremely difficult to obtain such compression rates using the prior art techniques.

As clear, the technical problems associated with the video signal transmission and storage are complex and typically require a specialized technique, adapted and optimized for a particular application. A number of specialized solutions are disclosed in the patent literature. For example, U.S. Pat. No. 5,046,122 discloses a system adapted for compression of binary image data. U.S. Pat. No. 5,121,216 discloses an adaptive transform algorithm for coding of still images. U.S. Pat. Nos. 5,086,488; 5,051,840; 5,109,451; 5,126,962 disclose different orthogonal transform coding systems for image data. Other prior art systems focus on methods of image segmentation, coding of image contours, etc. Examples are discussed in U.S. Pat. Nos. 5,091,976; 5,109, 438; 5,086,489; 5,058,186; 5,115,479. Other digital techniques for compressing different signals are currently under development. Examples include the use of advanced mathematical models, such as fractals (U.S. Pat. No. 5,065,447) and wavelets. In the case when a human viewer is the intended receiver, systems are proposed to use psychophysical information to reduce the perceptual effects of errors due to information compression.

There is currently a consensus that no single compression technique is likely to succeed in all different applications. The reason for this is that the performance of digital compression and coding systems is highly scene-dependent. Thus, an efficient coding system should be able to adapt to application specific conditions and apply different techniques to different portions of the image or image sequence in order to maximize the achievable compression ratio for a minimized perceivable effect to a human viewer.

Several adaptive systems have been proposed in the past to apply different techniques to different portions of the image and thus optimally exploit the advantages of specialized processing. An example is disclosed in U.S. Pat. No. 5,121,216 where a still input image is split into blocks, each of which is orthogonally transformed. Block attributes are next computed to determine threshold information and quantization parameters, so that "busy" image blocks are separated from relatively "quiet" image blocks to use differences in the perceptual error in each case to reduce the total amount of transmitted data. The use of this technique is however limited to storage and transmission of still images.

U.S. Pat. No. 5,091,782 discloses an apparatus and method for adaptively compressing successive blocks of digital video. The data compression method is optimized by using different compression algorithms in different data formats on a block-by-block basis. The method is especially suitable for use in interlaced television signal transmission, where the system specific separation of the video frames into even and odd fields allows the apparatus to process in parallel individual data blocks presented in a frame and field formats. The compression error in each format is evaluated and the one resulting in a smaller error is selected to represent the compressed image information. While enabling the use of paralellized processing to speed up the signal compression, the proposed method is deficient in that nearly half of the computed data is thrown out for each processed block. In addition, the method does not permit the incremental increase of image quality in processing areas where the error is larger than system specifications.

It would thus be advantageous to provide a compression system that combines the advantages of specialized processing for different types of images and image sequences by avoiding the disadvantages of prior art techniques. It would further be advantageous to provide such a system that permits video signals in different input formats to be compressed and then reconstructed with little degradation in the motion rendition. It would also be desirable to provide a general purpose compression system for optimizing the compression of digital data by combining different techniques to obtain peak performance under different possible conditions.

SUMMARY OF THE PRESENT INVENTION

It is thus an object of the present invention to provide a novel apparatus and method for digital video signal transmission and storage at a high compression rate.

It is another object of the present invention to provide a novel compression apparatus enabling data transmission over a bandlimited transmission medium such as a standard telephone line of full-motion video, videophone signals, still images, voice, FAX and other information.

Yet another object of the present invention is to provide a good quality real-time video conferencing system over a bandlimited transmission medium such as a standard telephone line.

It is another object of the present invention to provide a good quality full-motion image communication over a bandlimited transmission medium such as a standard analog telephone line.

It is another object of the present invention to provide a good quality full-motion video data to digital storage media at a low bit rate.

It is another object of the present invention to provide a still-image storage of highly compressed digital images into a memory.

It is also an object of the present invention to provide a hybrid coding system for coding of moving images with high prediction efficiency and very high information compression ratio.

It is another object of the present invention to provide a new and improved hybrid coding system for compression and encoding of moving images by overcoming the disadvantages and limitations of prior art coding systems.

These and other objects are achieved in one aspect of the present invention by providing an apparatus for the optimized compression of data from a video signal source. In accordance with a preferred embodiment, the input image from a video signal source is compressed in a first data path to provide a first compressed image signal. An error measure is then obtained from the compressed signal which measure corresponds to the error signal in individual image areas or blocks of the compressed image. Image blocks for which the error measure is larger than a predetermined threshold define a processing region where the compression error is to be reduced in order to meet certain transmission rate or image quality criteria.

The reduction of the compression error in the processing region is next achieved by forming image error blocks within the processing region. These error blocks are compressed, possibly in parallel, using at least one alternate data path to provide at least one compressed block error signal. The compression apparatus of the present invention further combines the compressed image signal and the compressed block error signals to provide a composite compressed image signal suitable for transmission and storage. The compression error of the composite signal is reevaluated within the processing region and new error blocks are formed, if necessary, to provide a new composite compressed signal. The process is repeated until the computed error measure in all image blocks of the original image is reduced below the predetermined threshold.

In another aspect of the present invention the proposed image compression apparatus further comprises means for receiving digitized video signal corresponding to a sequence of video frames. The current video frame is predicted from data obtained from at least one previous video frame. The predicted pixel data is then subtracted from the current video frame pixel data to obtain a prediction error pixel data which is used as an input image. This input image is subdivided into image blocks and an error measure is evaluated for each of the blocks. Image blocks having an error measure larger than a predetermined threshold are input to a motion detector and analyzer to determine motion vector data which is encoded for the corresponding individual blocks of the composite compressed image signal.

The error evaluating means of the compression apparatus preferably operate in the pixel domain by restoring a reference image from the compressed image signal and comparing it to the actual input image. The sum of the absolute errors, or alternatively the mean-squared error sum, of each pixel within an image block is used to compute the block error measure to be compared to a predetermined threshold. Alternatively, the error evaluating means may also operate in a transform domain by comparing the quantized and compressed transform coefficients to the full precision transform coefficients.

In another aspect of the present invention, a decoder apparatus is provided as part of an image transmission system. The decoder receives compressed digital video signals transmitted in blocks of pixel data which are compressed in a first data path and error blocks of pixel data which are compressed in at least one alternate data path. The apparatus further determines for each particular block of pixel data the specific compression data path used and decodes the received blocks using corresponding decompression paths. The uncompressed video signal is then recovered by combining the decoded pixel data blocks. In the case when a sequence of video image frames is transmitted, the decoder apparatus is also capable of retrieving motion vector data attached to the received blocks of pixel data. Data representing previous video frames is stored in a memory so that a prediction signal from the retrieved motion vector data and the stored data can be combined to restore the current video frame.

In accordance with a preferred embodiment of the present invention, each data compression and corresponding decompression path of the image transmission system may use a separate algorithm for compression and decompression of the image data blocks. Preferably, at least one data compression path corresponds to the computation for each image block of an array of transform coefficients which are obtained from an orthogonal data transform. Preferably, a two-dimensional discrete cosine transform is used in this case due to its very high efficiency in compressing image data. Other data compression transforms such as the Fourier transform, the Hadamard transform, the Haar transform, the cosine transform, or the statistically optimal Karhunen-Loeve (KL) transform may also be used for eliminating redundancies from the image data.

The compression apparatus of the present invention may further include means for encoding a sound signal and a function selector means for indicating the type of input signal to be processed. In addition, when using an interlaced digital video signal, the input signal may be formatted in a frame or field processing format, or both, for selecting for each video frame of the most appropriate compression path.

The adaptive video compression system of the present invention is capable of compressing digital video data in a ratio of over 1000:1 with a good quality for image sequences and a theoretically lossless transmission of static images.

BRIEF DESCRIPTION OF THE DRAWINGS

The manner by which the above objects and other objects, features, and advantages of the present invention are obtained will be fully understood in reference to the following detailed description when considered in view of the drawings, wherein.

DETAILED DESCRIPTION OF PREFERRED EMBODIMENTS

Figure 1:
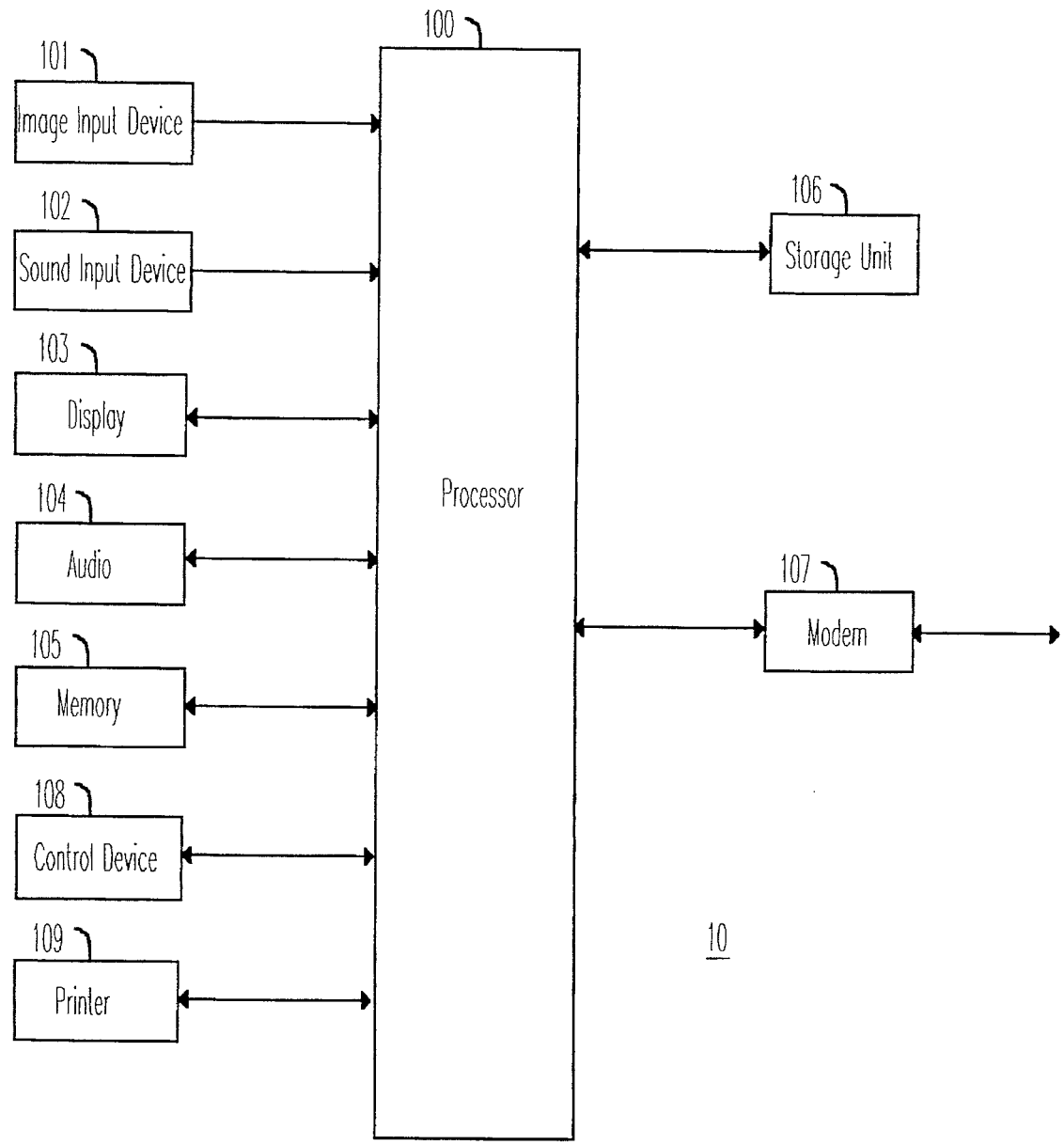
FIG. 1 is a schematic block diagram of one embodiment of the digital video communication and storage system of the present invention.

The present invention concerns a multi-functional system for digital transmission and storage of data, illustrated in a specific embodiment in FIG. 1. The transmission and storage system 10 in FIG. 1 is capable of handling a variety of signal processing tasks including the transmission and efficient storage of still and full-motion video information, voice, FAX and other type of data. A primary purpose of the system is the efficient communication of large volumes of data over a band-limited transmission medium, such as a telephone line, and its storage at a high compression rate. Since video information comprises by far the largest data block to be processed in such a system, the focus of the following presentation will be on the compression and transmission of video information. It is to be expressly understood, however, that the underlying principles of the inventive concept apply to processing of other types of data as well.

As illustrated in FIG. 1, communication and storage system 10 of the present invention comprises a main processor 100 to be described in detail next. System 10 further comprises means adapted to receive input signals such as images, sound, FAX, data files, and other types of data. Illustratively, the input means comprise an image input device 101, such as a camera and an imaging scanner, a sound input device 102, such as a microphone and a memory unit 105, such as a hard disk.

Communication and storage system 10 further comprises a storage unit 106 for storing input data at specific memory address locations in a data specific format. For example, video information is stored as frames or fields of compressed video images at associated address locations. Storage unit 106 may comprise a magnetic hard disk, a magnetic floppy disk, a magnetic tape, an optical disk and other devices for storing and retrieving data. In all cases, input data from different sources is labeled and adapted for fast retrieval, as well known in the art.

Communication and storage system 10 of the present invention further comprises a communication means to establish a two-way communication link with other user systems or data sources. Illustratively, the communication means is shown as a high-speed modem 107 and further comprises a digital transmission unit, a wireless transmission unit or other devices, not shown in the figure, for the transmission and reception of signals, primarily video images. In most cases, data is communicated in a compressed form as described in the sequel.

System 10 of the present invention further comprises output means for displaying video images, reproducing sound, and other output data. As shown in FIG. 1, the output means typically includes a display 103, such as a cathode ray tube display or/and a liquid crystal device display for viewing still or motion image and data; an audio unit 104, such as a speaker and an earphone; a printer 109, preferably a color imaging printer; a memory unit 105, such as a hard disk, and others. Printer 109 is preferably capable of generating a hard copy of the picture displayed on the display 103, as well as printing out data stored in memory unit 105 and control information from control device 108.

The operation and specific functions of the system 10 are controlled in use by a control device 108, such as a keyboard or a control panel including keys and other means (such as a touch screen and a "mouse") for choosing from a function menu displayed on the display.

At the heart of the digital communication and storage system 10 of the present invention is processor 100 which is capable of processing a number of different data types and formats such as video images, voice data, text files and other data. Processor 100 comprises a control unit and typically has a digital signal processor unit, a microprocessor unit, a mixed digital signal processor and microprocessor unit or other application specific devices for processing video, sound and other information. Processor 100 is operatively connected to the system's input devices (101, 102), the video, audio and general data output devices (103, 104, 109), memory unit 105, data storage unit 106, modem 107, and the function control device 108. Individual blocks as well as elements of the internal architecture of processor 100 are considered in more detail next.

In operation, processor 100 receives input data from the input devices 101, 102 and memory unit 105 as specified by the control device 108. Depending on the input signal type, the input data is compressed, encoded and multiplexed in an appropriate data transmission format. The processed data is stored or transmitted in a compressed form to storage unit 106 and modem 107. At the receiver end, processor 100 receives encoded compressed information from storage unit 106 and modem 107, demultiplexes and decodes the received information. The recovered data is output to display 103, audio unit 104, and memory unit 105, according to the particular data type.

The following description relates specifically to the processing, transmission and storage of digital video signals. Regardless of whether the input signal is a still image, a video-phone image sequence or a full-motion video signal frames, the image data is defined by a sequence of digital data bits corresponding to specific locations in the image referred to as picture elements or "pixels." A large amount of data is required to define even a single frame of a video signal. High definition television (HDTV) requires substantially more data to provide each video frame. In order to manage such large amounts of data, specifically for HDTV applications, the data must be compressed. As noted, different data formatting and/or compression techniques can be more efficient than others at different times depending on the particular processing area or the image sequence being transmitted. For example, field processing of video data is generally preferred in detailed moving areas. Frame processing generally works better when there is little or no motion involved. Linear orthogonal transforms have been shown to drastically reduce information transmission requirements for portions of the image of relatively low signal amplitude variations. The present invention provides a system that optimizes the compression of digital video data by switching between different processing techniques as appropriate for individual blocks of the processed image and providing motion compensation to account for motion of the transmitted data.

Figure 2:
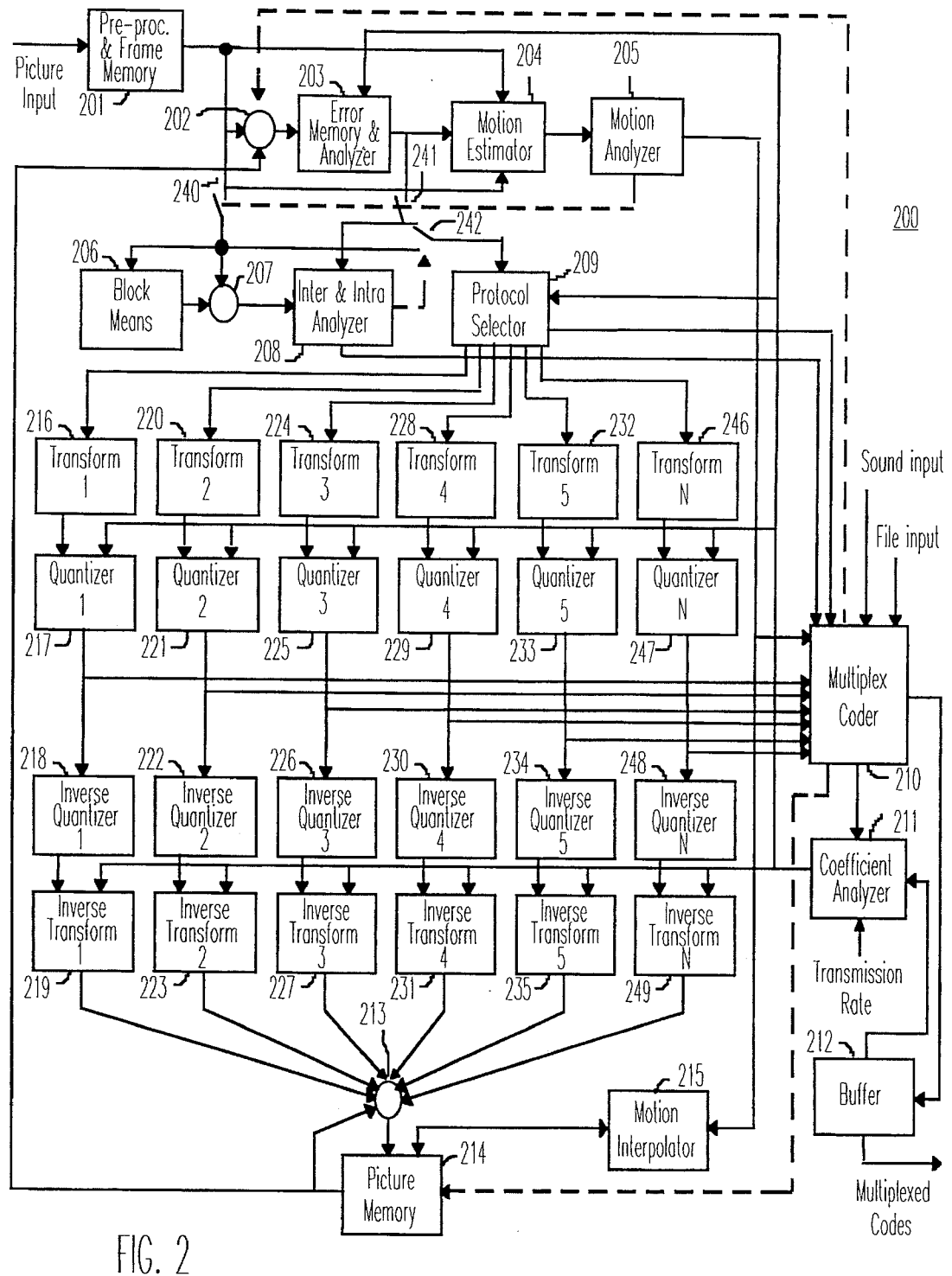
FIG. 2 is a block diagram of the adaptive video compression encoder of the present invention.

FIG. 2 is a block diagram of the adaptive video compression encoder which is part of processor 100 of the present invention. As shown in FIG. 2, a standard digitized video signal is input from any of the input video sources described above. The process of digitizing video signals is well known in the art and will not be discussed in any detail. Depending on the image source, a plurality of separate digitized signals may be provided for processing of various components of the image signals. For instance, this may involve separate luminance and chrominance signals in the case of a color television transmission. In accordance with the present invention, such individual signals may be processed separately in parallel and combined at a later stage as is well known in the art. For clarity of the presentation, in FIG. 2, is shown only one signal encoding channel corresponding to one input signal, illustratively the luminance portion of the video signal, which carries the most important to a human user information.

The digitized input signal from a video image source is input to the preprocessing and frame memory 201. The function of pre-processing memory 201 is to scale, filter, and format the input video signal, and store the formatted signal for further processing. As shown in FIG. 2, the image signal is preferably stored in a frame format. However, other formats, notably a field storage format, may be used for storing the input signal until the next video frame is input.

The adaptive video compression encoder 200 of the present invention operates on the current input image to remove the spatial information redundancy which may exist between different blocks of the image as well as temporal redundancy between information contained in successive image frames. To this end, encoder 200 forms in picture memory 214 a prediction image which is subtracted at subtractor 202 from the original image stored in memory 201. On output, subtractor 202 forms an error image, which typically has a reduced dynamic range for the pixel amplitude values to be transmitted and thus enables the desired signal compression.

The error image at the output of subtractor 202 is passed to error memory and analyzer 203 for further processing. In accordance with the present invention, the operation of subtractor 202 and error analyzer 203 is defined in terms of image areas or blocks of predetermined dimensions and is done over a processing region of the input image. The input image frame is segmented into a number of image blocks and the processing region is conceptually defined as the set of image blocks for which an amplitude measure of the error image signal is larger than a predetermined threshold. The processing region, which is also referred to as the coding region of a current frame, may thus be as large as the entire frame or as small as a single image block. The processing region may further comprise connected or disconnected sets of image blocks which are all appropriately labeled for computer access and further processing.

In accordance with the present invention, encoder 200 operates iteratively over the processing region of the current image frame until the error measure of all image blocks is reduced below the predetermined threshold. Thus, for a particular input image frame the encoder may take a different number of iterations to complete the coding process. Typically, for a telephone line transmission it takes about 5 to 8 iterations to obtain satisfactory results. At each iteration step a new prediction image is formed at picture memory 214 and the current processing region is redefined as the corresponding set of image blocks of large error measure at the output of subtractor 202. The processing region is next subdivided within error analyzer 203 into error image blocks of different dimensions determined to encompass all image blocks within the processing region. A possibly different compression technique is applied for processing each block and after each iteration.

Mathematically, the proposed operation of subtractor 202 may be expressed as follows:

$$ERR_{i,j}^t = IN_{i,j} - PE_{i,j}^t \text{ if } t = 1, \forall (i,j) \in \{FR\};$$

otherwise, $\forall (i,j) \in \{CR^{t-1}\}$ where $IN_{ij}$ is the i-th row and the j-th column pixel of the digitized input video signal at the pre-processing stage in block 201; $PE_{ij}^t$ it is the corresponding pixel of the prediction image in memory 214; $ERR_{ij}^t$ is the resulting pixel of the error data stored in error memory 203. Superscript t for the prediction and error data denotes the t-th processing iteration for the current frame. At the first frame and first iteration (t=1), the processing region coincides with the coding region (CR) so that the computation is done over the entire frame (FR). In the following iterations the computation of the error image is only done over the processing region as defined above. Thus, {FR} is the set of the pixels in the frame region, $\{CR^{t-1}\}$ is the set of the pixels in the coding region for the current frame at the t−1 th processing iteration, and $\{CR^{t-1}\} \subseteq \{FR\}$.

Once the error image at a given iteration is computed, error analyzer 203 computes an error measure for the individual blocks of the processing region. One possible measure is defined as the sum of the absolute values of the error signal over an image block. The error measure is computed as follows:

$$BERR_{k,l}^t = \left\{ \frac{1}{I \times J} \sum_i \sum_j \|ERR_{i,j}^t\| \right.$$

if $t = 1, \forall (i,j) \in \{FR_{k,l}\}$;

otherwise, $\forall (i,j) \in \{CR_{k,l}^{t-1}\}$ $$\left. I = \sum_i 1, J = \sum_j 1 \right\}$$

if $t = 1, \forall (k,l) \in \{BFR\}$; otherwise, $\forall (k,l) \in \{BCR^{t-1}\}$ where $BERR_{k,l}^t$ is the k-th row and l-th column image block of the error data at the t-th processing iteration; I and J are the horizontal and vertical dimensions of the image block; $\{FR_{k,l}\}$, $\{CR_{k,l}^{t-1}\}$ denote the set of the pixels in the k-th row and l-th column image block of the frame region (FR) and coding region ($CR^{t-1}$) regions respectively. Clearly, the pixels of an image block are subset of the set of pixels in the frame and coding region:

$$(\{FR_{k,l}\} \subseteq \{FR\}, \{CR_{k,l}^{t-1}\} \subseteq \{CR^{t-1}\}).$$

Finally, {BFR} is the subset of the block elements in the frame region, $\{BCR^{t-1}\}$ is the subset of the block elements in the coding region for the current frame at the t−1 th iteration.

The expressions above indicate that each time a new frame is input, subtractor 202 first operates on the entire input image. In subsequent iterations the processing region is determined by the set of image blocks for which the block error measure $BERR_{k,l}$ is larger than a predetermined threshold. An example of the used criterion to determine the processing region at each iteration can be expressed as follows:

$$BPR_{i,j}^t = \{(k,l) | BERR_{k,l}^t > ET^t; \text{ if } (t=1) \lor (ET^t < ET^{t-1}), \forall (k,l) \in \{BFR\};$$

otherwise, $$\forall (k,l) \in \{BPR^{t-1}\}\}, \text{ if } (t=1) \lor (ET^t < ET^{t-1}), \forall (i,j) \in \{BFR\};$$

otherwise, $$\forall (i,j) \in \{BPR^{t-1}\}$$

$$PR_{r,s}^t = \{(i,j) | \forall (i,j) \in \{FR_{k,l}\}, \forall (k,l) \in \{BFR\} \wedge \{BPR^t\}\}, \forall (r,s) \in \{FR\}$$

where $\{BPR^{t-1}\}$ is the set of the block elements in the processing region for the current frame at the t−1 th processing iteration; $\{PR^t\}$ is the set of the pixel elements in the processing region for the current frame at the t-th processing iteration; $ET^t$ is a error threshold at the t-th processing iteration which is determined by pre-specified image quality requirements and the desired transmission rate. The error threshold $ET^t$ is adjusted by the coefficient analyzer 211 in response to the output of multiplex coder 210 and preset transmission rate requirements.

Preferably, the image block dimensions are selected 4×4 or 8×8 pixels, dependent on the particular application. Specifically, if the input image contains more details or it is important to the user to reconstruct at the receiver's end an image closer to the original, it is desirable to use smaller size blocks. Alternatively, if the input image is of relatively uniform intensity and the specific application does not require high level of details, the input image blocks may be selected larger.

Once the set of blocks with error measure larger than the threshold $ET^t$ is determined, the defined processing region in error analyzer 203 is input to the motion estimator 204 and the motion analyzer 205 to determine a possible motion compensation with respect to the previous frame. Motion compensation is provided in the system of the present invention to increase the compression efficiency. At the first processing iteration of the current frame (t=1), image blocks within the processing region are digitally translated and compared to corresponding block areas of the image in the previous frame to determine whether the block error is not due to a temporal shift of an image element. If this is the case, the new image block need not be transmitted or stored independently since the coordinates of a motion shift vector and the prediction frame would be sufficient to restore the current frame. The operation of the motion estimation block may illustratively be written as follows:

$$MV_{r,s} = \left\{ (x,y) \| \min \left[ \frac{1}{I \times J} \sum_i \sum_j |IN_{i,j} - PE^1_{i+x,j+y}| \right] \right. < MT,$$

$$\forall (i,j) \in \{PR^t_{r,s}\}, \forall (x,y) \in \{MS\} I = \sum_i 1, J = \sum_j 1 \left. \right\}$$

$$\forall (r,s) \in \{BPR^t\}$$
$$BCR^t_{i,j} = \{(r,s) \| MV_{r,s}, \forall (r,s) \in \{BPR^t\}\}$$
$$\forall (i,j) \in \{BPR^t\}$$
$$CR^t_{r,s} = \{(i,j) \| \forall (i,j) \in \{FR_{k,l}\}, \forall (k,l) \in \{BFR\} \wedge \{BCR^t\}\},$$
$$\forall (r,s) \in \{FR\}$$

where MV is the motion vector, determined by computing the minimum error measure for an image block over the set of allowable directional motion shift vectors {MS} in the previous frame. MT is a motion threshold criterion which may be defined as known in the art. Indices I, J denote the dimensions of the image blocks, while x, y indicate respectively the horizontal and vertical shifts of the image block expressed in numbers of pixels.

Should motion analyzer 205 determine that the error measure for a select motion vector is smaller than the predetermined motion threshold MT, the corresponding vector is sent to multiplex coder 210 and motion interpolator 215. The output from multiplex coder 210 is sent to buffer 212 for transmission or storage. On the other hand, interpolator 215 uses the received motion vector to modify the stored image in picture memory 214.

Should none of the motion vectors computed in estimator 204 have an error measure smaller than the threshold MT, motion analyzer 205 indicates a non-motion compensation mode, in which case selectors 240 and 241 are closed. Case selectors 240 and 241 are also closed if t>1.

In the following step a decision is made in which one of at least two processing modes to process the large error measure image block. In a preferred embodiment of the present invention illustrated in FIG. 2 the decision is made between what is denoted as an inter and intra frame processing modes. The inter frame processing mode is selected if there is a coding gain to be realized from the prediction of the present frame from the previous frame(s). In this mode the encoder operates on the block error signal in error memory 203.

The intra frame processing mode is selected if the apparent prediction gain is less than the one obtained from directly encoding the corresponding region. In intra mode the encoder operates on the signal from frame memory 201.

The decision between an inter and intra processing modes for a particular block of the processing region is made in the system of the present invention in analyzer 208 and protocol selector 209. To this end, the prediction block error measure computed in analyzer 203 is compared to a similar block error measure computed from the output of subtractor 207 in analyzer 208. Subtractor 207 receives input from the current frame memory 201, and subtracts from each pixel value within an image block the mean signal amplitude of the corresponding block. This mean signal amplitude is in turn computed in block means 206.

The block error measures from error analyzer 203 and subtractor 207 are passed to the intra/inter analyzer 208, which determines whether the corresponding image block should be coded in an inter or intra mode.

Mathematically, the computation of the mean signal value M in each of the processing region image blocks can be written as follows:

$$M_{k,l} = \left\{ \frac{1}{I \times J} \sum_i \sum_j IN_{i,j} \| \forall (i,j) \in \{FR_{k,l}\}, I = \right.$$

$$\sum_i 1, J = \sum_j 1 \forall (k,l) \in \{FR\}$$

where $M_{k,l}$ is the mean value of the k-th row and l-th column image block of the processing region, and the remaining quantities are defined as above.

At subtractor 207 the mean value of an image block is subtracted from the actual pixel value:

$$MERR_{i,j} = IN_{i,j} - M_{i,j}, \forall (i,j) \in \{FR\}$$

and a block error measure BMERR is obtained as follows:

$$BMERR_{k,l} =$$

$$\left\{ \frac{1}{I \times J} | \sum_i \sum_j |MERR_{i,j}| \| \forall (i,j) = \{FR_{k,l}\}, I = \sum_i 1, J = \sum_j 1 \right\},$$

$$\forall (k,l) \in \{BFR\}$$

The decision whether to use an inter or intra mode is made at analyzer 208 in accordance with the following criterion: $MODE_{k,l} = \{\text{intra}; \text{ otherwise select inter if } (BERR_{k,l}^t > BMERR_{k,l})\}$ where the block error measures $BERR_{k,l}^t$ and $BMERR_{k,l}$ are defined as above for the k-th row and the l-th column image block of the error and the input frame data respectively. The decision $MODE_{k,l}$ is the status determined for the corresponding image block.

If analyzer 208 determines for a given block an intra mode, the stored frame data in the processing region is selected by the selector 242 and the process is passed to protocol selector 209. For the inter mode selection, the input data to be processed is taken from the stored error data in the processing region of error memory 203 and passed to protocol selector 209.

Following the mode selection at analyzer 208, protocol selector 209 determines an optimal protocol for covering the previously determined processing region with a set of coding blocks. A coding block, as determined by selector 209, may correspond to a single array of connected image blocks, which case is defined as a single block protocol. Protocol selector 209 may also cover a set of disconnected image blocks within the processing region, in which case is defined as a combination block protocol. Generally, protocol selector 209 specifies the shape of the coding blocks adaptively by determining at each processing iteration the shape of the corresponding coding blocks from the configuration of the image blocks within the processing region. The following expression can be used to make the determination of the coding region:

$$BCR_{i,j}^t = \{ (k,l) \| \text{ if } ET^t > E_N^t, \sum_{(k,l)} \text{Shape}(BPR_{k,l}^t)$$

$$= \max_j \text{Shape}(BS_j); \ldots ;$$

if $E_2^t > ET^t > E_1^t$, $\sum_{(k,l)} \text{Shape}(BPR_{k,l}^t) = \max_j \text{Shape}(BS_j), j \leq 2;$ if $ET^t < E_1^t$, $\sum_{(k,l)} \text{Shape}(BPR_{k,l}^t) = \text{Shape}(BS_1);$ $\forall (k,l) = \in \{BPR^t\}, \forall j \in \{N\}\}, \forall (i,j) \in \{BPR^t\}$
$CR_{r,s}^t = \{(i,j) \| \forall (i,j) \in \{FR_{k,l}\}, \forall (k,l) \in \{BFR\} \wedge \{BCR^t\}\},$
$\forall (r,s) \in \{FR\}$ where $E_N^t$, •••, $E_2^t$, and $E_1^t$ are error threshold criteria at the t-th processing iteration; $BS_j$ is the j-th block size and other quantities are defined as above. For computational considerations, the shape of the coding blocks is preferably square, however other coding block shapes can also be used.

Following the optimal protocol determined at protocol selector 209, the processing region video data is compressed by using a linear transformation of the coding block(s) into transform domain coefficients.

Several well known orthogonal transforms can be used in connection with the present invention to increase the compression ratio of the overall system. One such transform is the discrete cosine transform ("DCT") which is known to be a highly efficient way to encode image data blocks particularly when followed by an adaptive quantization scheme. The DCT is a linear transformation which may be accomplished as a matrix manipulation of a block of data which generates an equal size block of pixel data, each pixel of which being a linear combination of the input pixels of the original block. Different linear transforms are distinguished by the set of coefficients used in the linear combinations that define the transformed pixel value. The particular set of coefficients used in the DCT has the property of closely approximating what would be a statistically optimal set and has been found very efficient in practical applications. The very near optimality of the DCT implies that the degree of data compression obtained is very close to the theoretical minimum that can be achieved.

The two-dimensional (2D) DCT which is preferably used at the N transform blocks 216, 220, 224, 228, 232, and/or 246 of the present invention has been shown to be particularly efficient in an image coding system. Each transform block corresponds to a different processing block size and may be implemented separately. Illustratively, the block sizes selected for the individual transform blocks may be 4×4 for transform block 216, 8×8 for block 220, 16×16 for block 224, 32×32 for block 228, 64×64 for block 232, and 128×128 for block 246. Other block sizes and transform block configurations may also be applied whenever necessary.

Typical for all such transforms is that the energy of the signal is concentrated on specific spacial frequency components. Thus, the data to be transmitted can be substantially reduced by allocating large number of bits to spacial frequency components with large amounts of energy and correspondingly a small number of bits to spacial frequency components with a small amount of energy. Following the optimal protocol selection at block 209, different size coding blocks within the processing area may be sent in parallel to transform arrays 216–246 for further processing.

The computation of the individual transforms is done using a fast transform algorithm, preferably in hardware for increased computational speed. The number of the transform blocks N of the encoder 200, and the select block sizes $BS_j$ for each branch are set depending on the computational capability of processor 100, the video frame size, the desired compression rate, and the image degradation requirements for the particular application.

The transform coefficients computed in any of the transform blocks 216–246 are adaptively quantized by quantizers 217, 221, 225, 229, 233 to 247 correspondingly. The step size of the quantizers 217–247 can be adjusted by the coefficient predictor 211 depending on the transmission rate. Specifically, when transmission buffer 212 is close to full, as indicated by a special flag, coefficient predictor 211 will cause an increase in the step size of the quantizers as to reduce the number of bits necessary to be coded. Otherwise, if the processing region of the current frame is relatively small, so that less additional coefficients need to be transmitted, the step size of the quantizer blocks will be decreased to improve picture quality.

The transform coefficients at the output of the transform/quantizer blocks are output to multiplex coder 210 which is used to reduce the information redundancies in the quantized coefficient and motion vector sequences. Specifically, multiplex coder 210 can use entropy coding such as Huffman coding and arithmetic coding to reduce the number of bits to be transmitted. The principles of entropy and Huffman coding are well known in the art and can be found, for example, in "Digital Coding of Waveforms: Principles and applications to Speech and Video," by N. S. Jayant and Peter Noll, corresponding chapters of which are incorporated herein by reference. Multiplex coder 210 further encodes and multiplexes the image block addresses, the block processing mode, the quantized transform coefficients, motion vectors, and other control information, as well as the input from sound and data compression sources which may be used simultaneously. The coded bits at the output of multiplex coder 210 are then sent to buffer 212 for transmission or storage.

The output of quantizers 217–247 are further used to form the prediction image in picture memory 214 for the next processing iteration. To this end, the quantized data is first recovered by the inverse quantizer blocks 218, 222, 226, 230, 234 or 248 and the inversely transformed into the spatial domain in inverse transform blocks 219, 223, 227, 231, 235 or 249. The processed coding blocks are then added at the appropriate block addresses to stored picture by summer 213 and stored in the picture memory 214. The new prediction image in memory 214 is then passed to subtractor 202 to initiate the next processing iteration.

The operation of encoder 200 is fully adaptive in that the flow of coded data from multiplex coder 210 is kept at a substantially constant bit rate by controlling the step size of the quantizers 217–247, and the protocol criteria of the protocol selector 209. The threshold parameters are dependent on the current status of transmission buffer 212 and the achievable transmission rate for a specific transmission medium. The actual values of the thresholds used to adjust the coding rate in operation may be determined analytically or empirically using statistical dependencies.

Figure 3:
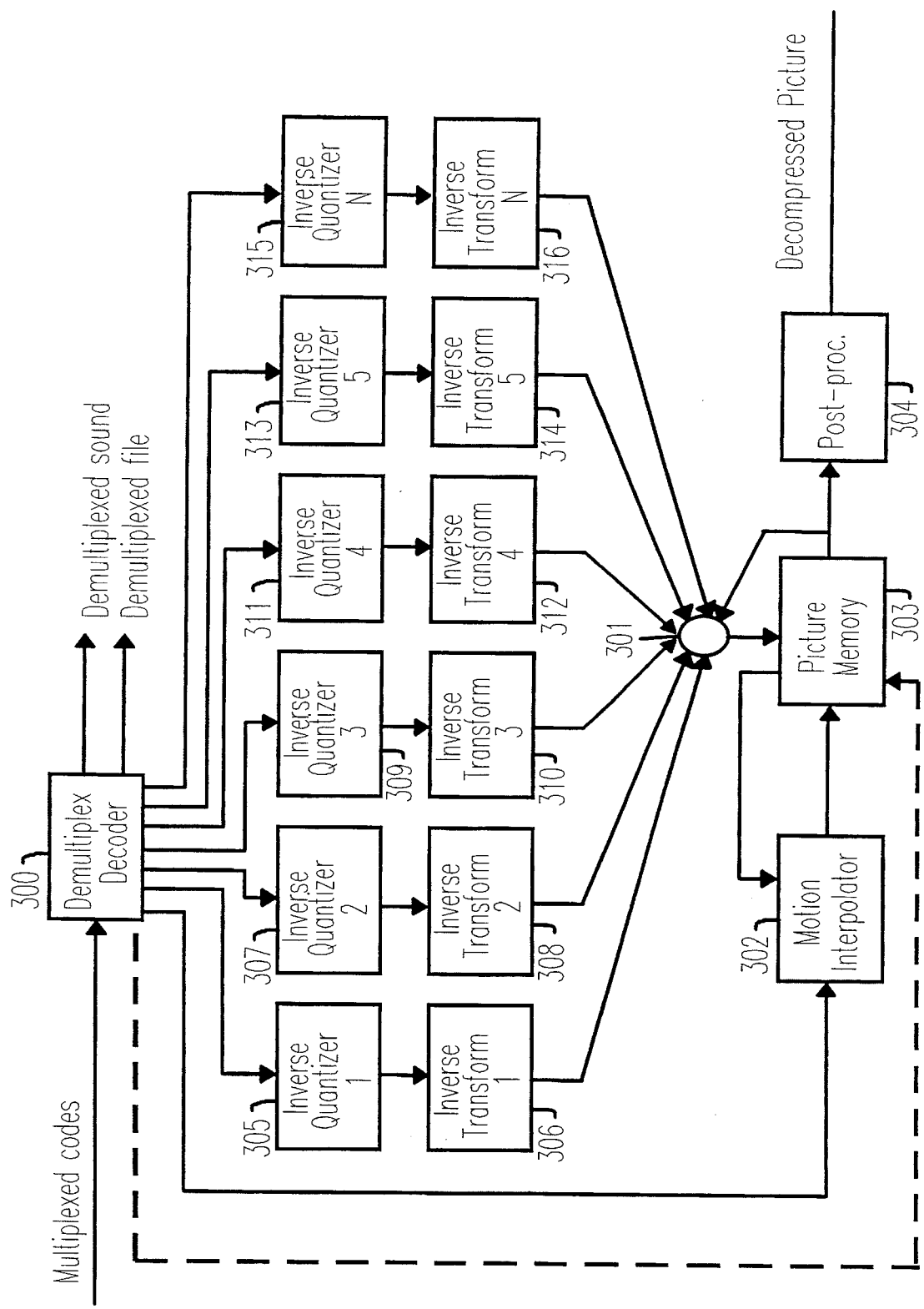
FIG. 3 is a block diagram of the adaptive video compression decoder of the present invention.

FIG. 3 is a schematic block diagram of the adaptive video decompression decoder of the present invention. The decoder is in effect the inverse of the encoder; most modules in the decoder block in FIG. 3 also appear in the block diagram of the encoder in FIG. 2 and for this reason will not be treated in much detail.

In operation, as shown in FIG. 3, decoder 300 decodes and demultiplexes the block addresses, the block processing mode, the quantized transform coefficients, the quantization parameters, motion vectors and other control data.

The motion vectors are sent to the motion interpolator 302 to modify the stored image in the picture memory 303.

The quantized data representing the transform coefficients is recovered by inverse quantizers 305, 307, 309, 311, 313 to 315. This is followed by an inverse transform into the spatial domain, within blocks 306, 308, 310, 312, 314 or 316 dependent on the block processing mode, then added into the stored image in picture memory 302 by the summer 301.

The stored video data is then passed to the post-processing 304 to scale, filter, and format the video signal to obtain a standard video output.

Figure 4:
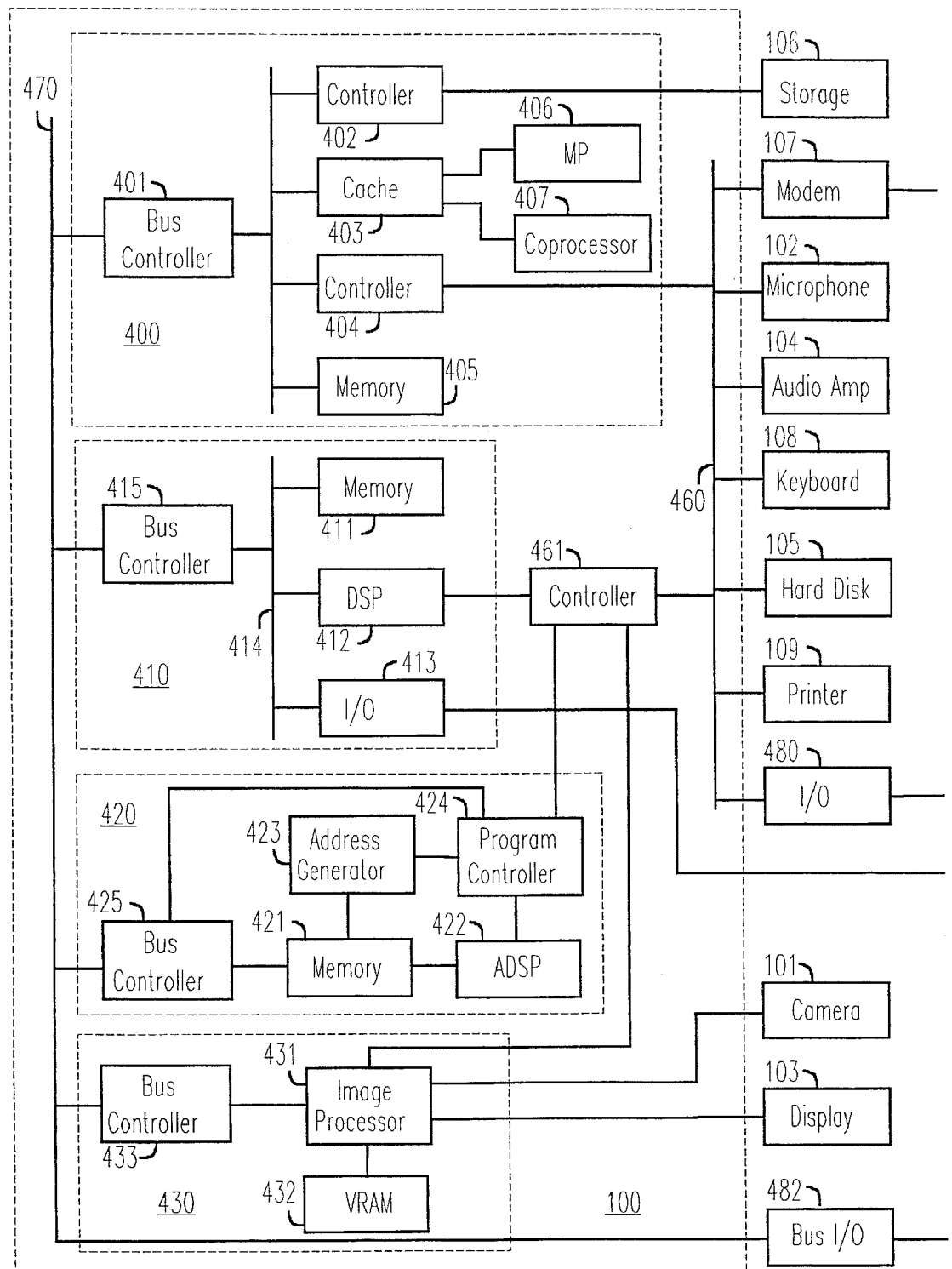
FIG. 4 is an illustration of the internal architecture of the processor in accordance with one embodiment of the present invention.

FIG. 4 is a schematic block-diagram of a specific embodiment of processor 100 shown in FIG. 1. As illustrated, processor 100 includes a microprocessor section 400, a digital signal processor section 410, a digital array signal processing section 420, an image processing section 430, a high speed bus 470 and the MC bus 460.

Microprocessor section 400 provides the basic electronics for a PC-type computer while digital signal processor 410 and the array signal processor 420 provide processing power for real-time digital signal processing. Image processor 430 comprises full functional image grabber and is suitable for display processing. Processor sections 400, 410, 420 and 430 communicate via the high speed bus 470.

Microprocessor section 400 includes a microprocessor 406 with a cache controller 403. Cache controller 403 is preferably a 4 way set associative cache capable of supporting direct memory access (DMA) which is included in the inter-bus controller 404 transfers to memory 405 at the same time as microprocessor 406 is accessing the cache memory. Connected to microprocessor 406 is a standard math co-processor 407.

Inter-bus controller 404 includes logic circuitry required to support the operation of microprocessor 406 including interrupt controllers, timers, DMA controllers, real time clock, and others. In addition to the core logic, inter-bus controller 404 supports the MC bus 460.

High-speed bus controller 401 for the microprocessor section 400 of the processor 100 is connected to microprocessor bus 408 which links the memory 405, the inter-bus controller 404 and the memory side of cache controller 403. High speed bus controller 401 can request and receive the bus from the cache controller 403 while microprocessor 406 continues to execute out of cache 403.

The interface controller 402 is connected to microprocessor bus 408. A standard or non-standard interface may be used. For instance, as SCSI controller 402 is used for SCSI storage disk 106.

The digital signal processing section 410 provides a complete DSP processing system including an interface to DSP I/O. The digital signal processor section 410 comprises a digital signal processor 412, memory 411, I/O interface 413, high speed bus controller 415 and DSP bus 414. The I/O interface 413 includes an expandable I/O interface and a serial I/O interface.

The main portion of digital array processor section 420 is the digital array signal processor 422. Signal processor 422 is capable of performing transform specific operations, such as the DCT transform and block arithmetic operations. Each specific function requires an address pattern produced by address generator 423 to select data from memory 421 for use by digital signal processor 422. The program controller 424 outputs the necessary instruction codes to array processor 422.

Memory 421 includes three types of memory: data, coefficients and acquisition memory. Each data memory unit is used as a temporary storage area for data as it moves recursively through digital signal processor 422 in operation. The coefficient memory unit stores coefficients such as the trigonometric functions, windowing coefficients, and the filter response coefficients. The acquisition memory unit holds input data from the high speed controller 425, 433 until it is loaded into the system for processing. Processed data is then returned to the acquisition memory units where it is accessed by the high speed bus controller 425.

The address generator 423 supplies a series of addresses to all memories when used. Each set of memory units is connected to an adjacent address generator which outputs addresses to the array. Thus, address generator 423 includes three types of address generators: data, coefficient and acquisition.

The image processor section 430 comprises an image processor 431, VRAM 432, and a high speed bus controller 433. The input video from camera 101 is digitized and decoded by image processor 431, then stored in VRAM 432 and sent to the high-speed bus controller 433. The decompressed digital video data of the composite data received from the high speed controller 433 is sent to the VRAM 432 and converted by the image processor 431 into an analog video signal, which is then sent to the display 103.

MC bus 460 provides an I/O channel to processor 100 via controller 461 which can also control the processing instructions. Microprocessor section 400 provides a full set of signals for the I/O channel. Most I/O devices such as the modem 107, the microphone amplifier 102, the audio amplifier 104, the keyboard 108, the hard disk 105, the printer 109, and the standard RS-232 interface 480 are interfaced to MC bus 460.

Finally, high speed bus 470 provides high speed communication connecting bus controllers 401, 415, 425 and 482.

It is to be expressly understood, that the processor architecture shown in a block-diagram form in FIG. 4 and discussed in connection with FIG. 2 and FIG. 3 only serves as an illustration and numerous modifications may be used to improve the overall system's performance. For example, memory unit 105 may be physically included in storage unit 106; Sound and file compression techniques may be applied at processor 100 and the sound input and file memory units.

Furthermore, while the encoder of the present invention was shown to employ only two processing modes and use transform coding techniques, other possible modes and coding techniques can also be applied. Specifically, for the transmission of interlaced TV signals, a decision can be made whether to process the input signal in a frame or a field format. Both formats can be applied simultaneously, and the one resulting in a lesser error measure can be used for further processing. In addition, other known coding techniques such as block truncation, vector quantization, subband, hierarchical, and interpolative coding or a combination thereof can also be used. In such case the DCT transform and inverse transform blocks along with the quantizers, as illustrated in FIGS. 2–3 may be replaced or supplemented by appropriate functional blocks corresponding to the applied coding techniques. The important concept is to redefine the processing region within the input image following each processing iteration, while using the best applicable to a particular situation compression and coding technique. Naturally, processor 100 may be implemented as a parallel processor, to increase the processing speed of the system.

It is thus to be expressly understood that the claimed invention is not to be limited to the description of the preferred embodiment but encompasses other modifications and alterations within the spirit of the inventive concept which scope is defined by the following claims.

What is claimed is:

1. An apparatus for compression of data from a video signal source comprising:

means for compressing an input image from the video signal source in a first data path to provide a first compressed image signal;

first interpolating means for interpolating a prediction image from said first compressed image signal;

means for comparing the prediction image to the input image;

evaluating means for evaluating the input from said means for comparing with respect to a predetermined threshold of an error measure;

means for forming image error areas where the error measure is evaluated to be larger than the predetermined threshold;

means for compressing said image error areas in at least one alternate data path to provide at least one compressed area correction signal;

second interpolating means for interpolating a prediction processing region from said at least one compressed area correction signal and said first compressed image signal;

means receiving input from said second interpolating means for supplying said prediction processing region to the comparing means; and means for combining said first compressed image signal and said at least one compressed area correction signal to provide a composite compressed image signal.

2. The compression apparatus of claim 1 wherein interpolation of said first compressed image signal and said at least one compressed area correction signal is done within said processing region.

3. The compression apparatus of claim 1 further comprising:

means for receiving a digitized video signal containing pixel data defining a sequence of video frames;

means for predicting a current video frame from pixel data obtained from at least one previous video frame;

means for subtracting the predicted pixel data from the corresponding current video frame pixel data to obtain prediction error pixel data;

means for presenting said prediction error pixel data as an input image to said means for compressing an input image in said first data path.

4. The compression apparatus of claim 3 further comprising means for formatting the video signal from said sequence of video frames.

5. The compression apparatus of claim 4 wherein the means for formatting are capable of storing the video signal from said sequence of video frames into either a frame format or a field format.

6. The compression apparatus of claim 5 wherein at least one data path is adapted to process video signals in said frame format and at least one data path is adapted to process video signals in said field format.

7. The compression apparatus of claim 3 further comprising:

means for encoding at least one image area of said first compressed image signal with motion vector data generated by said means for predicting.

8. The compression apparatus of claim 7 further comprising means for encoding compressed image signals and compressed area correction signals with data indicative of the path in which such compressed image signals and compressed area correction signals originated.

9. The compression apparatus of claim 8 further comprising means for providing from said composite compressed image signal a compressed digital video data stream.

10. A receiver for decoding the compressed digital video data stream from the apparatus of claim 9 comprising:

means for detecting encoding data from said compressed image signals and compressed area correction signals to identify the data path from which such signals originated;

processing means for processing each of said compressed image signals and compressed area correction signals in a corresponding decompression data path identified in said means for detecting.

11. The compression apparatus of claim 1 wherein each image area has a rectangular shape and has horizontal and vertical dimensions selected to be powers of two.

12. The compression apparatus of claim 11 wherein the horizontal and vertical dimensions are identical and are selected to be equal to four.

13. The compression apparatus of claim 1 further comprising:

control means for monitoring the amount of data of the composite compressed signal; and threshold computing means responsive to said control means for adaptively computing the predetermined threshold supplied to the evaluating means to adjust desired compression rate of the input image.

14. An apparatus for compression of data from a video signal source comprising:

means for compressing an input image from the video signal source in a first data path to provide a first compressed image signal;

first interpolating means for interpolating a prediction image from said first compressed image signal;

means for dividing the prediction image into image areas of predetermined dimensions;

means for comparing the prediction image to the input image;

evaluating means for evaluating the input from said means for comparing with respect a predetermined threshold of an error measure, wherein the error measure is evaluated for each image area;

means for monitoring the output of the evaluating means, wherein the set of image areas having an error measure larger than the predetermined threshold is defined as a processing region;

means for forming image error areas where the error measure is evaluated to be larger than the predetermined threshold; wherein said means for forming comprises means for combining image areas of said processing region into error areas shaped to completely cover said processing region;

means for compressing said image error areas in at least one alternate data path to provide at least one compressed area correction signal; and means for combining said first compressed image signal and said at least one compressed area correction signal to provide a composite compressed image signal.

15. The compression apparatus of claim 14 wherein said means for compressing image error areas are adapted for parallel processing of error areas in alternate data paths.

16. The compression apparatus of claim 14 wherein the error measure in an image area is computed as the average absolute error of differences between pixel values of an image area of the input image and the pixel values of corresponding image area of the prediction image interpolated from the first compressed image signal.

17. The compression apparatus of claim 14 wherein the error measure in an individual image area is computed as the means-squared error of the differences between pixel values of an image area of the input image and the pixel values of corresponding image area of the prediction image interpolated from the first compressed image signal.

18. A method for optimizing the compression of blocks of digital data comprising the steps of:
   a) compressing the digital data blocks in a first data path to provide a first compressed signal;
   b) evaluating errors in the compressed signal with respect to a predetermined threshold;
   c) forming error data blocks corresponding to data blocks with an error evaluated to be larger than the predetermined threshold;
   d) compressing said error data blocks in at least one alternate data path to provide a compressed correction signal;
   e) combining said first compressed signal and said compressed correction signal to provide a composite compressed signal;
   f) performing steps b through e of the method until no data block of the composite compressed signal is evaluated to have an error signal larger than the predetermined threshold.

19. The method of claim 18 wherein the, the step of forming error data blocks comprises the step of combining data blocks into error data blocks to completely cover the region where the error is evaluated to be larger than the predetermined threshold.

20. The method of claim 13 further comprising the step of encoding said first compressed signal and each compressed error signal with data indicative of the corresponding data path in which said compressed signal and each compressed correction signals originated.

21. A method for decoding the composite compressed signal of claim 20 comprising the steps of:
   a) detecting encoding data from said first compressed signal and each compressed correction signal to identify the corresponding data path from which such signals originated;
   b) processing, in response to the detected encoding data, said first compressed signal and each compressed correction signal in a decompression data path corresponding to the identified data path from which such signals originated.

22. The method of claim 21 wherein each data compression path and corresponding decompression path uses a separate algorithm for compression and decompression of the data blocks.

* * * * *